United States Patent
Shimada et al.

(10) Patent No.: US 6,864,940 B2
(45) Date of Patent: Mar. 8, 2005

(54) LIQUID CRYSTAL DISPLAY APPARATUS AND METHOD OF MANUFACTURING THE SAME VIA SHORT-CIRCUITED BUS LINES

(75) Inventors: Yoshinori Shimada, Mie (JP); Tadanori Hishida, Kashihara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/653,904

(22) Filed: Sep. 4, 2003

(65) Prior Publication Data

US 2004/0041962 A1 Mar. 4, 2004

Related U.S. Application Data

(62) Division of application No. 09/759,374, filed on Jan. 16, 2001, now Pat. No. 6,628,356.

(30) Foreign Application Priority Data

Jan. 18, 2000 (JP) .......................................... P2000-8619
Oct. 16, 2000 (JP) ....................................... P2000-314834

(51) Int. Cl.$^7$ ...................... G02F 1/1335; G02F 1/1343
(52) U.S. Cl. ....................... 349/143; 349/106; 349/139; 349/149; 430/20
(58) Field of Search ................................ 349/139, 143, 349/187, 104, 106, 149; 430/20; 345/100, 104

(56) References Cited

U.S. PATENT DOCUMENTS

| 4,800,375 A | | 1/1989 | Silverstein et al. | |
| 5,598,283 A | * | 1/1997 | Fujii et al. .................. | 349/143 |
| 5,712,064 A | | 1/1998 | Miyazaki et al. | |
| 5,748,266 A | | 5/1998 | Kodate | |
| 6,111,623 A | | 8/2000 | Sato | |
| 6,211,534 B1 | * | 4/2001 | Matsumoto .................. | 257/59 |
| 6,249,326 B1 | | 6/2001 | Hebiguchi | |
| 6,323,871 B1 | | 11/2001 | Fujiyoshi et al. | |
| 6,583,777 B2 | * | 6/2003 | Hebiguchi et al. ............ | 345/92 |

FOREIGN PATENT DOCUMENTS

| JP | 6-82617 A | 3/1994 |
| JP | 9-159992 A | 6/1997 |
| JP | 11-7269 A | 1/1999 |

* cited by examiner

*Primary Examiner*—Huyen Ngo
(74) *Attorney, Agent, or Firm*—Nixon & Vanderhye P.C.

(57) ABSTRACT

A method of driving an LCD is provided, where adjacent bus lines are short-circuited during LCD driving operations. In certain example embodiments, an inverse driving technique is used to invert the polarity of a video signal at every one row for instance. In certain example embodiments, short-circuited adjacent data lines (source lines) are in communication with pixels of the same color.

6 Claims, 8 Drawing Sheets

LIQUID CRYSTAL DISPLAY APPARATUS AND METHOD OF MANUFACTURING THE SAME VIA SHORT-CIRCUITED BUS LINES

This application is a divisional of application Ser. No. 09/759,374 filed Jan. 16, 2001 now U.S. Pat. No. 6,628,356.

BACKGROUND OF THE INVENTION

1. Field of the Invention

The present invention relates to a division of pixels of color filters used in a color liquid crystal display panel or the like. Particularly, the invention relates to the correlation between a high-definition liquid crystal panel and a low-price AV (audio-visual) liquid crystal television panel as well as to a method of manufacturing these two modules correlated to each other.

2. Description of the Related Art

Conventionally, in manufacturing both a high-definition liquid crystal display panel and a low-price AV liquid crystal television panel, TFT (thin film transistor) substrates, which have different design specifications in resolution or a number of pixels, are formed on respective glass substrates from the beginning, and then a color filter substrate, driving circuit and driving ICs are formed to match respective TFT substrates and then they are assembled together.

When a high-definition liquid crystal panel and a low-price AV liquid crystal television panel are manufactured, even if they have the same display sizes and different numbers of pixels, the conventional art does not have an idea of using a common TFT substrate by changing the color filters, driving ICs and driving circuits.

Japanese Unexamined Patent Publication JP-A 6-82617 (1994) (Applicant: FUJITSU CO. LTD.) is directed to a method of dividing pixels in pixel groups each of which is composed of a plurality of color pixels and discloses that color filters are provided which are capable of accommodating to graphics, characters and drawings, respectively. Though the Gazette discloses that a single pixel group consists of three pixels for R, G and B having different shapes respectively, it does not disclose that the scale of each pixel group is changed, namely the resolution is varied by forming one pixel group consisted of plural pixels of different colors such as R, G, B and like colors wherein the number of pixels is the product by a factor of an integer.

Alternatively, Japanese Unexamined Patent Publication JP-A 11-7269 (1999) (Applicant: SONY CO., LTD.) discloses a driving method in which pixels arranged in a matrix form over substantially the entire screen of a panel are laid out, namely a plurality of pixels are allocated to a single pixel group irrespective of the resolution of an inputted video signal in order to provide a display apparatus having ability to accommodate to a plurality of video signals having different standards by devising signal processing for a panel having fixed pixels and a fixed total number of pixels such as a liquid crystal display panel or a plasma display panel.

This Gazette, however, does not disclose that the arrangement of color filters is changed with varying respective resolution.

In the conventional process for manufacturing both a high-definition liquid crystal display panel and a low-price AV liquid crystal television panel, it is necessary to initially form TFT substrates having different design specifications in resolution or number of pixel groups, and then form color filter substrates, driving circuits and driving ICs such as to match TFT substrates respectively. Thus, member sharing of TFT substrate or the like is not performed. Neither JP-A 6-82617 nor JP-A 11-7269 discloses any art of using a TFT substrate adapted for display of high resolution video signals and a color filter substrate adapted for display of low resolution video signals which is different from a color filter substrate adapted for high resolution thereby providing a panel for display of low resolution video signals.

SUMMARY OF THE INVENTION

An object of the invention is to provide a liquid crystal display apparatus capable of being used for both high-definition liquid crystal panels and low-price liquid crystal television panels, thereby enhancing the production efficiency and yield of such panels, and a method of manufacturing the same.

The invention provides a liquid crystal display apparatus comprising a pair of substrates, a plurality of pixel electrodes which are arranged in a matrix form, formed on one substrate of the pair of substrate, and a plurality of color filters of n (n is an integer of two or more) number of colors corresponding to the plurality of pixel electrodes, the plurality of color filters being arranged so that color filters of a same color sequentially form m (m is an integer of two or more) number of columns, wherein n×m×l (l is a natural number) pixels form one pixel group.

According to the invention, since one pixel group consists of n×m×l pixels, when both a high-definition liquid crystal panel and a low-price liquid crystal television panel are manufactured, if they have the same display size but different numbers of pixels, by using a TFT substrate as a common part and using different color filter substrate, driving ICs and driving circuit, it is possible to manufacture both the high-definition liquid crystal panel and the low-price liquid crystal television panel by changing only the latter half of a production line, whereby the delivery time can be shortened. Further, since commonality of components can be achieved, the production efficiency is improved.

In the low-price liquid crystal panel, since each pixel group consists of a plurality of pixels and has an wide area, even if one of pixels is defective, such a defective pixel is difficult to be recognized visually and hence does not render the one pixel group defective. This leads to an improved production yield of liquid crystal panels, hence, to an improved efficiency in volume production.

In the case where such a defective pixel forms a black spot, such a black spot is difficult to be recognized as a defect when the size of such a pixel is approximately the same as that of a pixel for use in a high-definition panel. Even where such a defective pixel forms a bright spot, if a bright spot is modified into a black spot, it will be more hardly recognized as a defect, thus leading to a further improved production yield.

In the invention it is preferable that each of the plurality of pixel electrodes is provided with a TFT.

According to the invention, a TFT substrate can be used.

In the invention it is preferable that the n number of colors are three primary colors consisting of red (R), green (G) and blue (B).

According to the invention, it is possible to display a color image composed of the three primary colors, namely, R, G and B.

In the invention it is preferable that the color filters are formed on the other substrate of the pair of substrates.

According to the invention, the color filters can be formed on the TFT substrate or the counter substrate.

In the invention it is preferable that the liquid crystal display apparatus comprises a driver the same as that used in a liquid crystal display apparatus having color filters of n number of colors arranged sequentially, and different color filters and controller from those used in the latter liquid crystal display apparatus.

According to the invention, in a high-definition liquid crystal panel and a low-price liquid crystal panel, a common part can be used.

In the invention it is preferable that the liquid crystal display apparatus in which the n×m×l pixels form one pixel group is constructed by short-circuiting a bus line extending in the direction of column at every n pixels or a bus line extending in the direction of row at every one pixel.

According to the invention, the number of internal circuits in the horizontal and vertical drivers can be significantly reduced by short-circuiting the bus lines.

The invention provides a method of manufacturing a liquid crystal display apparatus comprising a step of laminating a TFT substrate on which a plurality of pixel electrodes are arranged in a matrix form, and a color filter substrate on which a plurality of color filters of n (n is an integer of two or more) number of colors corresponding to the plurality of pixel electrodes, the plurality of color filters being arranged so that color filters of a same color sequentially form m (m is an integer of two or more) number of columns, to form one pixel group consisting of n×m×l (l is a natural number) pixels.

According to the invention, since one pixel group consists of n×m×l pixels, when both a high-definition liquid crystal panel and a low-price liquid crystal television panel are manufactured, if they have the same display size but different numbers of pixels, by using a TFT substrate as a common part and using different color filter substrate, driving ICs and driving circuit, it is possible to manufacture both the high-definition liquid crystal panel and the low-price liquid crystal television panel by changing only the latter half of a production line, whereby the delivery time can be shortened. Further, since commonality of components can be achieved, the production efficiency is improved. In the low-price liquid crystal panel, since each pixel group consists of a plurality of pixels, even if one of pixels is defective, such a defective pixel does not render the one pixel group defective. This leads to an improved production yield of liquid crystal panels.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
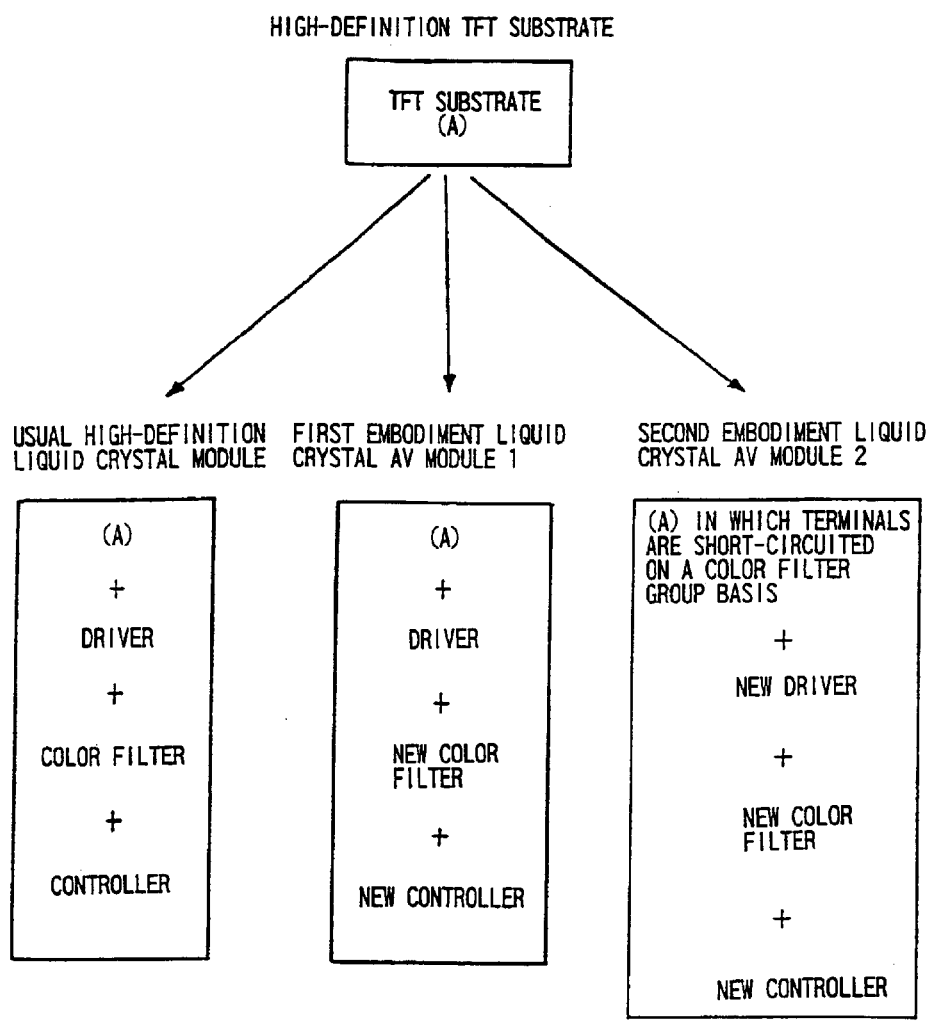
FIG. 1 is a comparative view for comparing mutual manufacturing components of a high-definition liquid crystal module with those of a liquid crystal AV module.

Now referring to the drawings, preferred embodiments of the invention are described below.

FIG. 1 is a comparative view for comparing a method of manufacturing a low-definition liquid crystal module of the invention with that of manufacturing a conventional high-definition liquid crystal module, in which method of the invention a TFT substrate identical with that for a high-definition liquid crystal module is used and a latter half of manufacturing steps are slightly different from those of the high-definition liquid crystal module.

The relation between the number of pixel groups in the high-definition liquid crystal panel and the number of pixel groups in the liquid crystal AV panel is ideally such that the number of pixel groups in the high-definition liquid crystal panel can be divided by a factor of the number of source bus lines or gate bus lines in the liquid crystal AV panel. Even if there is a remainder, the remainder may be appropriately allocated.

The manufacturing steps are described as follows.

Figure 3:
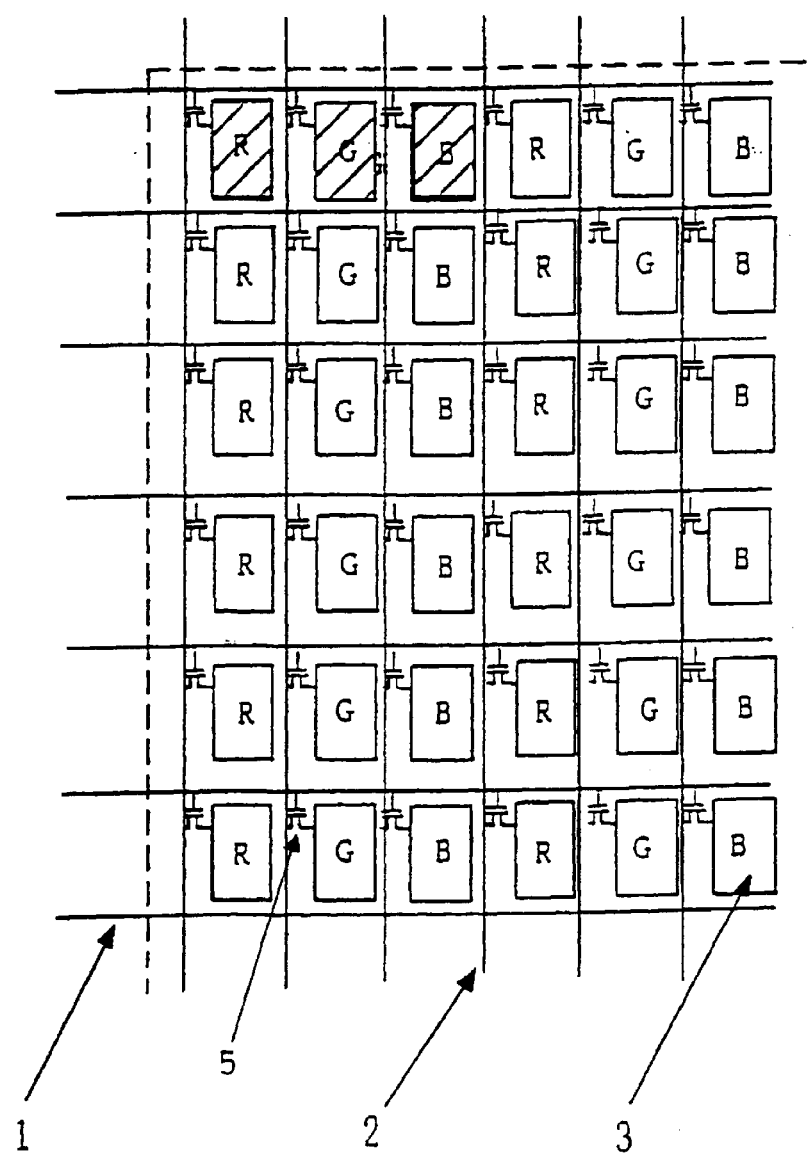
FIG. 3 is a view showing the arrangement of color filters on a counter substrate in a high-definition liquid crystal display apparatus, in which the diagonally shaded portion is equivalent to one pixel group.

First, a high-definition TFT substrate (A) is formed. When the high-definition liquid crystal module is to be manufactured, as shown in FIG. 3, the high-definition TFT substrate (A) is laminated as a counter substrate with color filters wherein one pixel group is formed by colors R, G and B. For convenience of illustration of the arrangement of color filters, FIG. 3 shows gate bus lines 1, source bus lines 2, pixels 3 and TFT devices 5, which are all absent on the counter substrate. Each of the pixels 3 is what is called a pixel electrode.

Figure 2:
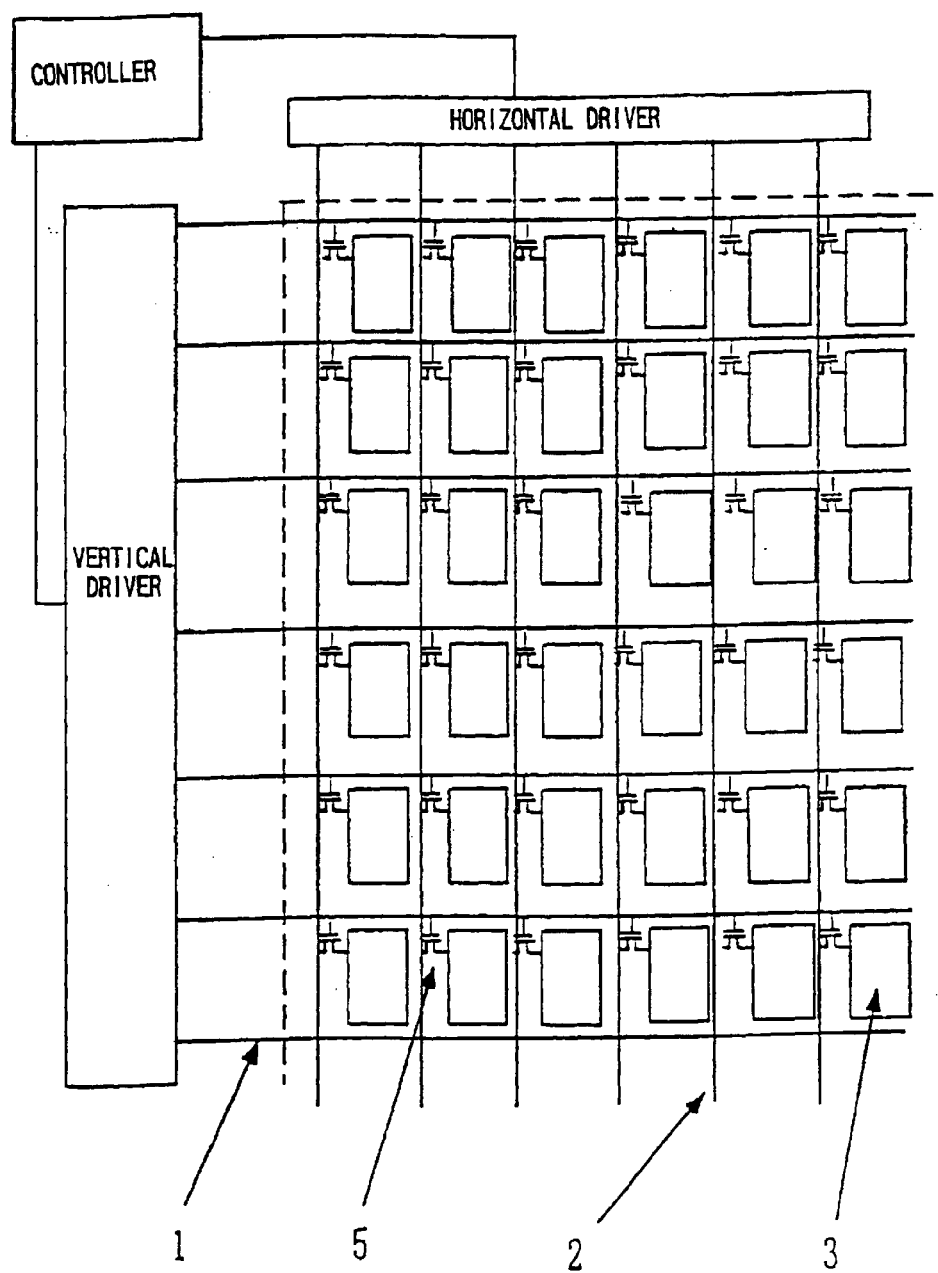
FIG. 2 is a block diagram showing the overall configuration of a high-definition liquid crystal module.

In turn, as shown in FIG. 2, drivers and controller adapted for a high-definition substrate are connected to the high-definition TFT substrate (A) to complete the high-definition TFT liquid crystal module.

In FIG. 1, components of the high-definition TFT substrate module thus manufactured are indicated schematically in a rectangular block labeled "Usual High-Definition Liquid Crystal Module".

The following description is directed to two liquid crystal AV modules having different resolutions (number of pixel groups) and using high-definition TFT substrates as used in the above high-definition liquid crystal module, which modules are manufactured as a first embodiment and a second embodiment, respectively.

First Embodiment

In the first embodiment, a liquid crystal AV module is manufactured by changing only the color filters and controller from among the components used in the high-definition liquid crystal module into corresponding ones adapted for an AV module.

Figure 5:
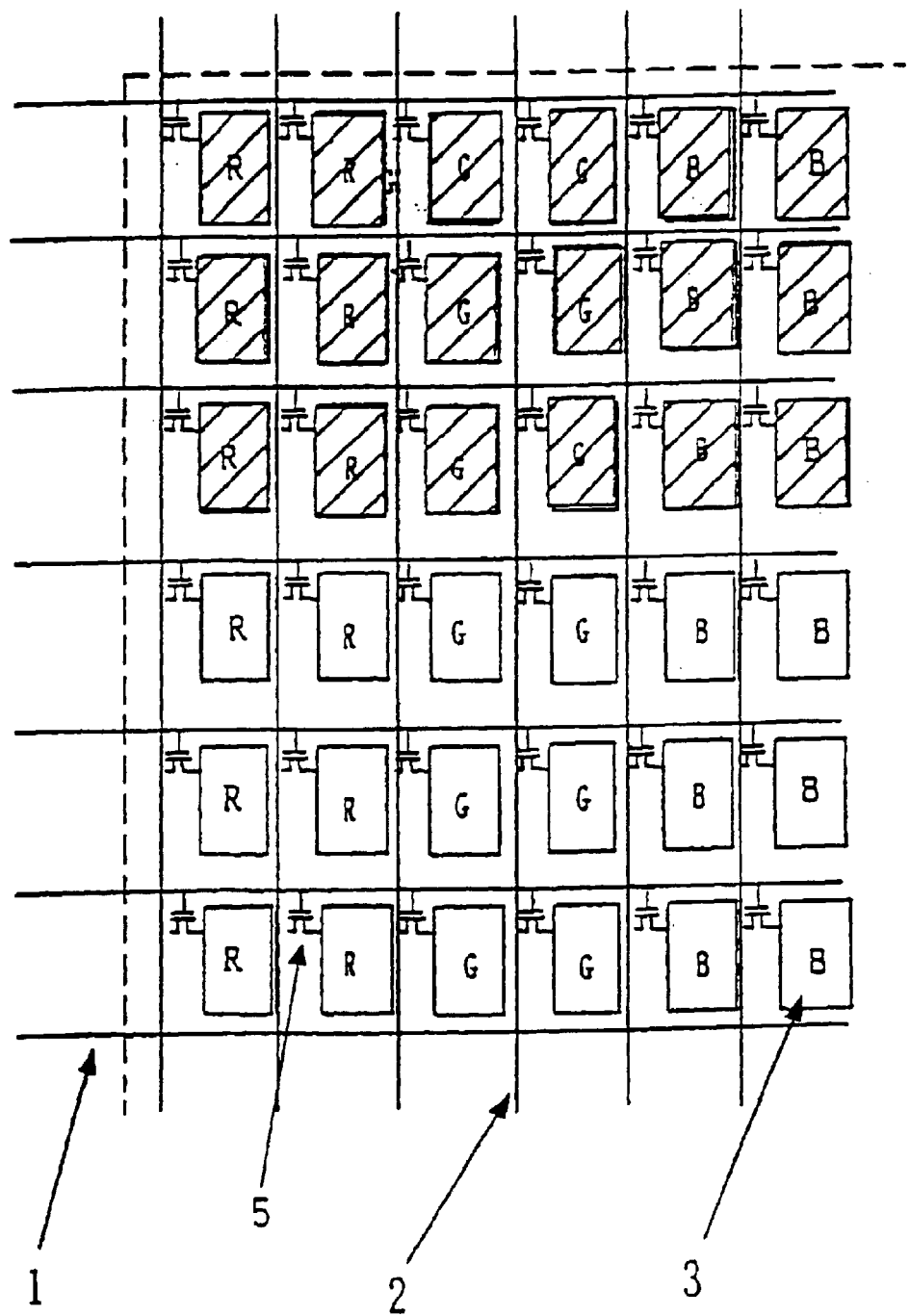
FIG. 5 is a view showing an example of the arrangement of new color filters on a counter substrate of the AV display module used in the manufacture of the AV display module according to the first embodiment, in which the diagonally shaded portion is equivalent to one pixel group.

As shown in FIG. 5, the high-definition TFT substrate (A) is laminated as a counter substrate with new color filters wherein colors for R, G and B are allocated to a corresponding group of pixels and that one pixel group consists of a plurality of pixels. For convenience of illustration of the arrangement of color filters, FIG. 5 shows gate bus lines 1, source bus lines 2, pixels 3 and TFT devices 5, which are all absent on the counter substrate. Each of the pixels 3 is what is called a pixel electrode.

In this embodiment, an example is shown wherein one pixel group consists of pixels of 3 rows×6 columns. However, the invention is not limited to this value.

Figure 4:
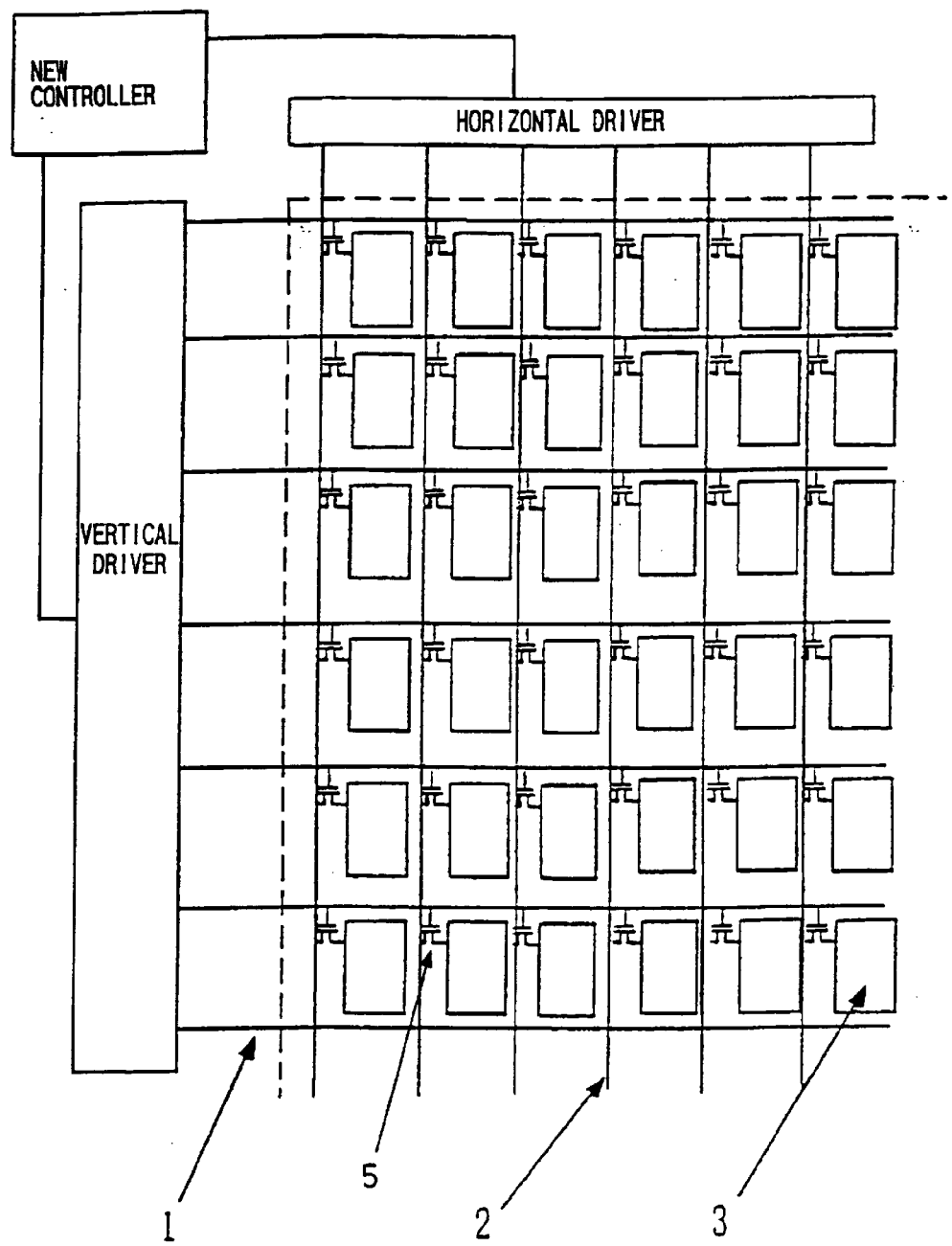
FIG. 4 is a block diagram showing the overall configuration of an AV display module according to a first embodiment of the invention.

In turn, as shown in FIG. 4, horizontal and vertical drivers used for the high-definition TFT are used, a new controller is connected so as to correspond to the arrangement of colors shown in FIG. 5 and the liquid crystal AV module is completed.

According to this method, the liquid crystal AV module can be completed by substituting only the new color filters of the color arrangement shown in FIG. 5 and the new controller shown in FIG. 4.

Second Embodiment

In the second embodiment, a liquid crystal AV module is manufactured by changing the color filters, drivers and controller of the components used in the high-definition liquid crystal module into corresponding ones adapted for an AV module and by short-circuiting terminals of the high-definition TFT substrate on a group basis.

The high-definition TFT substrate (A) is modified by short-circuiting the terminals of the source bus lines and gate bus lines on a group basis using a photo step. Specifically, in the formation of pixel electrodes, a photomask used to form the pixel groups of a conventional high-definition panel is substituted with a photomask wherein terminals are short-circuited on a group basis. Thus, a TFT substrate adapted for the purpose can be obtained only by changing one photomask.

Figure 6:
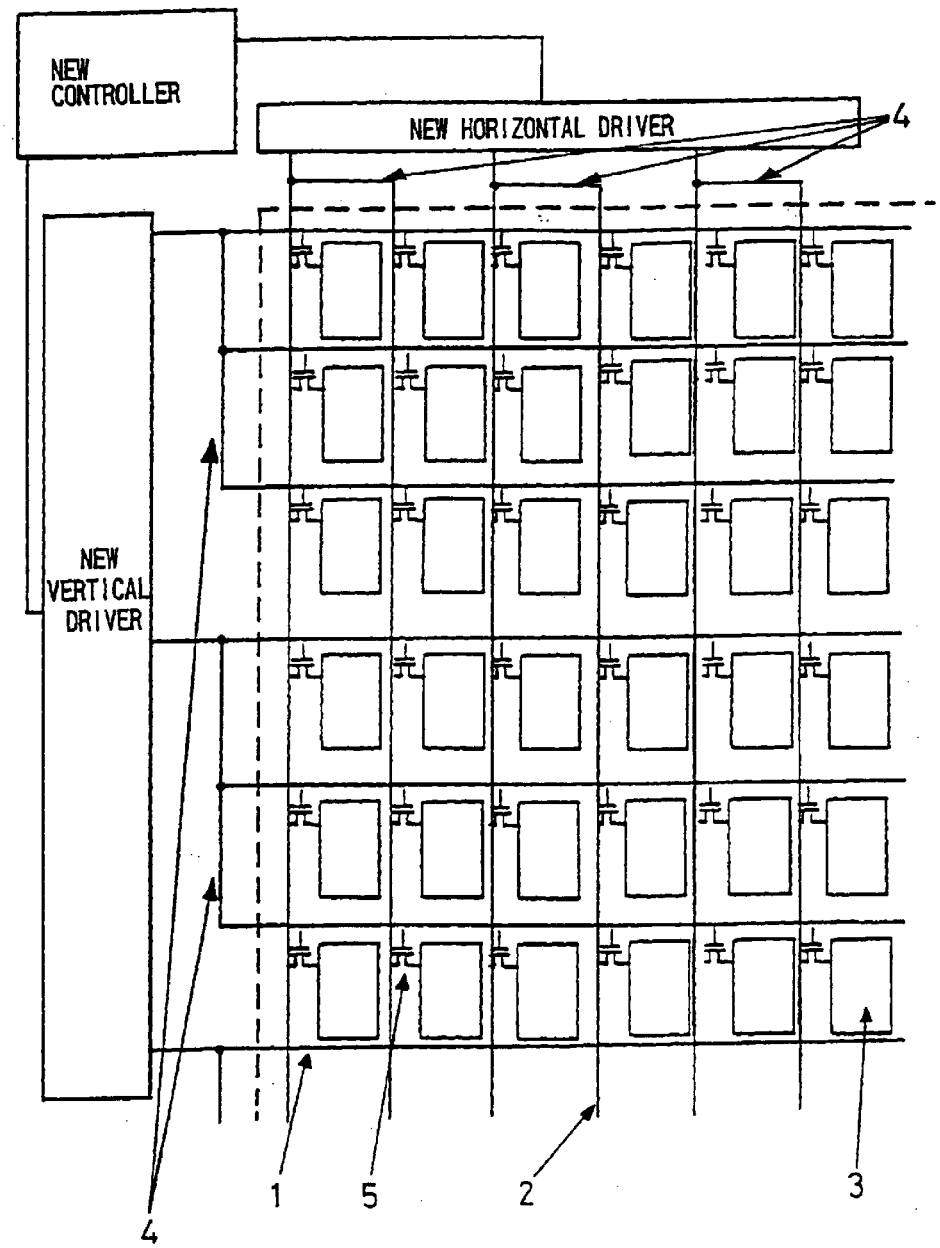
FIG. 6 is a block diagram showing the overall configuration of an AV display module according to a second embodiment of the invention.
Figure 7:
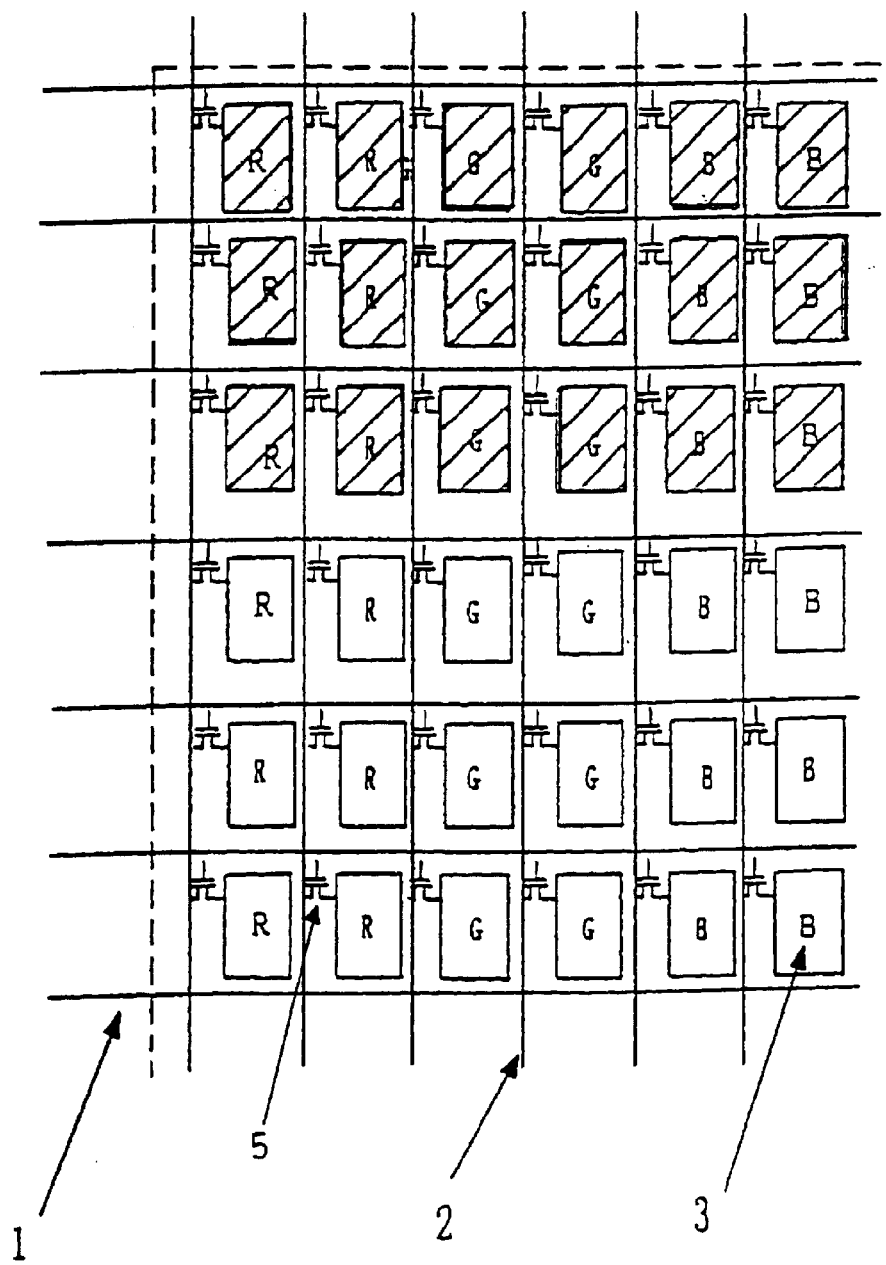
FIG. 7 is a view showing the arrangement of new color filters on a counter substrate of the AV display module according to the second embodiment, in which the diagonally shaded portion is equivalent to one pixel group.

The TFT substrate thus obtained is shown in FIG. 6. As shown in FIG. 7, the TFT substrate is laminated with a new color filters wherein R, G and B colors are allocated to corresponding pixel groups of pixels and that one pixel consists of a plurality of pixels. In this embodiment, one pixel group consists of pixels of 3 rows×6 columns, however, numbers of rows and columns are not limited to these values.

In turn, new horizontal and vertical drivers corresponding to the number of short-circuited bus lines are connected to the resulting structure to complete the liquid crystal AV module. According to this method, the liquid crystal AV module can be obtained by substituting only the new color filters as shown in FIG. 7 and the new horizontal and vertical drivers and new controller as shown in FIG. 6 for the corresponding ones used in the high-definition liquid crystal module and merely short-circuiting the bus lines of the high-definition TFT substrate.

According to the second embodiment, the number of internal circuits in the horizontal and vertical drivers can be significantly reduced by short-circuiting of the bus lines.

In the case of a pixel group consisting of 3 rows×6 columns, for example, the number of internal circuits required in the new horizontal driver is three, which would otherwise be six, and the number of internal circuits required in the new vertical driver is one, which would otherwise be three. Such a reduction in the number of internal circuits can be easily realized by arranging the color filters into groups in each of which color filters of the same color are located side-by-side according to this embodiment.

In the case of the color filter arrangement shown in FIG. 3 in which a set of three color filters for R, G and B forms one pixel group, short-circuiting of the bus line interconnecting color filters of the same color would make the wiring structure complicate due to the presence of color filters for different colors, hence, increase the number of steps for realizing such a complicated wiring structure.

Though the bus lines are short-circuited on the TFT substrate in the second embodiment, it is possible to employ an arrangement such that short-circuiting is made in the drivers. In this case, the number of output terminals from the drivers is the same as that of the first embodiment. For the same reason as that described above, the color filter arrangement in this embodiment enables easy short-circuiting.

Further, though the bus lines of both the new horizontal driver and the new vertical driver are short-circuited in the second embodiment, it is possible to short-circuiting the bus lines of any one of them. Taking the one-line inverse drive to inverse the polarity of a video signal at every one row for instance, the bus lines of the new horizontal driver may be short-circuited, while the bus lines of the new vertical driver may not be short-circuited but configured to be individually operated in sequence for ensuring an improved display quality.

In this case also, there results an advantage that the number of internal circuits in the new horizontal driver is reduced. Though the color filters for R, G and B are used in the embodiment, the invention is not limited to these colors. The embodiment is applicable for color filters with two or more colors.

Further, though the color filters are formed not on the TFT substrate side but on the counter substrate side in the embodiment, they may be formed on the TFT substrate side.

In this case, the liquid crystal AV module can be manufactured by using a TFT substrate on which color filters are formed corresponding to the liquid crystal AV panel as a high-definition TFT substrate on which color filters are not formed.

Figure 8:
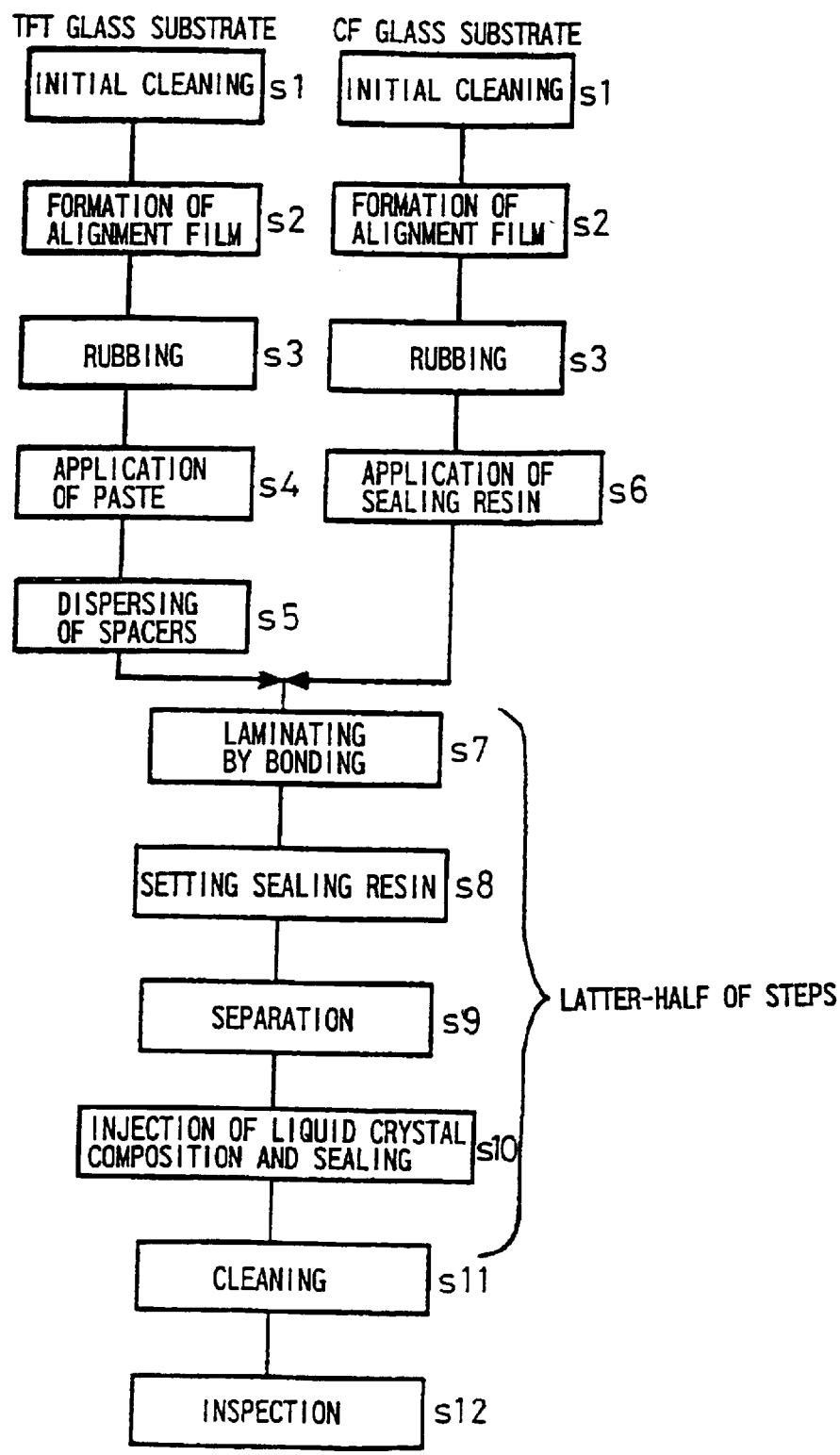
FIG. 8 is a diagram distinctly explaining a TFT substrate step, a color filter step, and a latter-half of steps (after the laminating step).

FIG. 8 is a flowchart of the manufacturing steps of a liquid crystal cell, including a TFT substrate forming step, a color filter (CF) substrate forming step, and a latter half of steps. With reference to FIG. 8, the steps up to the completion of the liquid crystal cell are described below.

First, initial cleaning is performed (S1); an alignment film is formed on the TFT substrate having TFT devices formed on a glass substrate (S2); the alignment film is rubbed (S3) to allow liquid crystal molecules to easily align in a predetermined direction; a paste for provisional fixing is applied onto the substrate (S4); and spacers are dispersed (S5). The color filter substrate is also formed with an alignment film, following by rubbing; and a sealing resin is applied onto the substrate (S6).

Subsequently, the both substrates are laminated together by bonding (S7); after the sealing resin is set (S8); and the cells are separated from each other by cutting the glass substrates (S9). In turn, a liquid crystal composition is injected into each cell by utilizing a vacuum and the injection port is sealed with a resin (S10); and finally cleaning (S11) and inspection (S12) are performed to complete each liquid crystal cell.

The remainder of manufacturing steps after laminating the both substrates is referred to as the "latter-half of steps". Drivers and a controller are formed in the liquid crystal cell thus manufactured to complete a liquid crystal module.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of driving a liquid crystal display, the method comprising:

provialing a plurality of pixels in the liquid crystal display, each of the pixels including a switching transistor having a gate electrode, a source electrode and a drain electrode, wherein the drain electrode of each transistor is in electrical communication with a corresponding pixel electrode;

providing a first driver in communication with a plurality of gate lines, the gate lines being in electrical communication with gate electrodes of the transistors;

providing a second driver in communication with a plurality of source lines, the source lines being in electrical communication with source electrodes of the transistors;

wherein a first source line is only in communication with pixels of a first color, a second source line immediately adjacent to the first source line is also only in communication with pixels of the first color, and a third source line immediately adjacent to the second source line is only in communication with pixels of a second color different than the first color; and wherein under a condition where the first and second source lines are short-circuited, display operation is carried out using an inverting polarity drive scheme.

2. The method of claim 1, wherein the first and second source lines are short-circuited during display operation while no gate lines are short-circuited.

3. The method of claim 1, further comprising inverting the polarity of a video signal at every x rows.

4. The method of claim 1, wherein the liquid crystal display comprises a plurality of color filters of n (n is an integer of two or more) number of colors corresponding to the plurality of pixel electrodes, the plurality of color filters being arranged so that color filters for a same color sequentially form m (m is an integer of two or more) number of adjacent columns, and a plurality of pixel groups each comprising a plurality of pixels, and wherein n×m×l (l is a natural number) pixels form one pixel group.

5. A method of driving a liquid crystal display, the method comprising:

providing a plurality of pixels in the liquid crystal display, each of the pixels including a switching transistor having a gate electrode, a source electrode and a drain electrode, wherein the drain electrode of each transistor is in electrical communication with a corresponding pixel electrode;

providing a first driver in communication with a plurality of gate lines which in turn are in electrical communication with gate electrodes of the transistors;

providing a second driver in communication with a plurality of source lines which in turn are in electrical communication with source electrodes of the transistors;

during display operation, short-circuiting the first and second of the gate lines;

wherein the liquid crystal display comprises a plurality of color filters of n (n is an integer of two or more) number of colors corresponding to the plurality of pixel electrodes, the plurality of color filters being arranged so that color filters for a same color sequentially form m (m is an integer of two or more) number of adjacent columns, and a plurality of pixel groups each comprising a plurality of pixels, and wherein n×m×l (l is a natural number) pixels form one pixel group, and wherein the short-circuited gate lines are in communication with at least pixels of the same pixel group.

6. A method of driving a liquid crystal display, the method comprising:

providing a plurality of pixels in the liquid crystal display, each of the pixels including a switching transistor having a gate electrode, a source electrode and a drain electrode, wherein the drain electrode of each transistor is in electrical communication with a corresponding pixel electrode;

providing a first driver in communication with a plurality of gate lines, the gate lines being in electrical communication with gate electrodes of the transistors;

providing a second driver in communication with a plurality of source lines, the source lines being in electrical communication with source electrodes of the transistors;

wherein a first source line is only in communication with pixels of a first color, a second source line immediately adjacent to the first source line is also only in communication with pixels of the first color, and a third source line immediately adjacent to the second source line is only in communication with pixels of a second color different than the first color; and wherein under a condition where a plurality of source lines connected to same color pixels are short-circuited, carrying out display operation in an inverting polarity drive scheme.

* * * * *